J. Henderson.
Refining Iron & Steel.
No. 93,713. Patented Aug. 17, 1869.
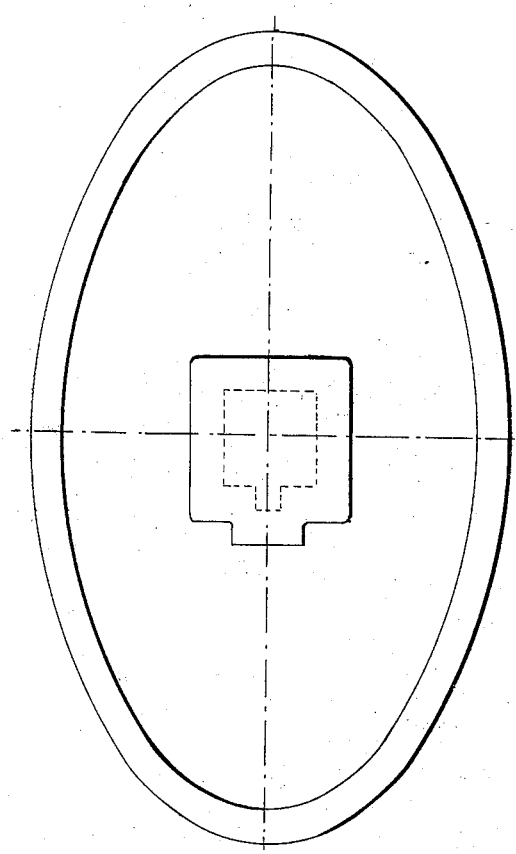
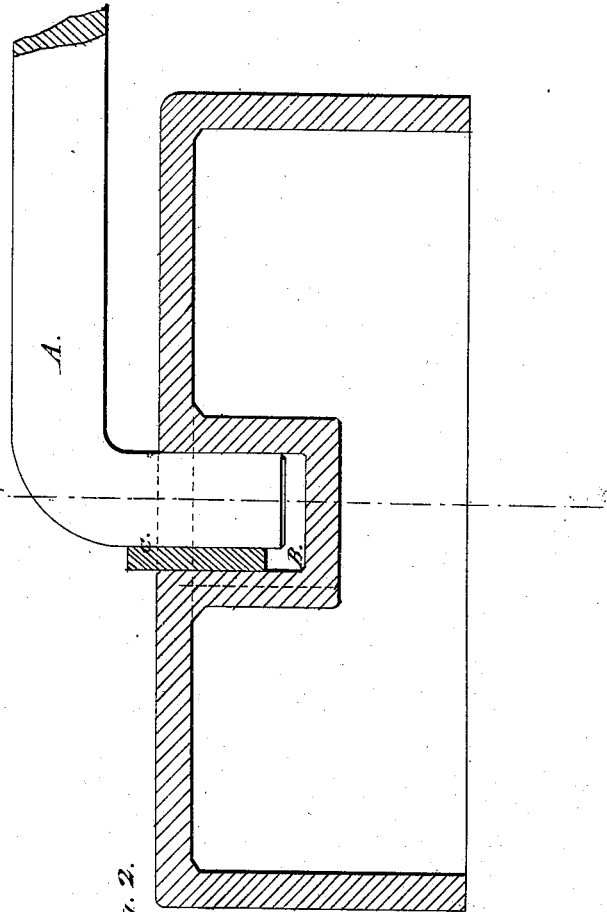

United States Patent Office.

JAMES HENDERSON, OF NEW YORK, N. Y.

Letters Patent No. 93,713, dated August 17, 1869; antedated August 4, 1869.

---

IMPROVEMENT IN THE MANUFACTURE OF IRON AND STEEL.

---

The Schedule referred to in these Letters Patent and making part of the same.

---

*To all whom it may concern:*

Be it known that I, JAMES HENDERSON, of the city, county, and State of New York, have invented certain new and useful "Improvements in the Manufacture of Iron and Steel;" and the following is a full, clear, and exact description of the same.

This invention has for its object improvements in the manufacture of iron and steel, in refining, puddling, and other furnaces, and consists in the manner of decarbonizing, refining, and purifying the molten metal, by means of substances placed in vessels or boxes, which are open at the bottom and closed at the top, and these vessels being placed underneath the molten metal, the escaping gases caused by the heat will pass up from the bottom of the apparatus, thus passing through the metal, and will purify, refine, and decarbonize it.

Heretofore, when substances have been used for these purposes, the effect has only been partial and uncertain, and this uncertainty of the result has been consequent on the manner of the application of the substances used, owing to the impossibility of an equal and proper dissemination of the articles used among the metal to be operated upon.

In some instances powders have been stirred among the metal, or by the use of substances made into a ball, and attached to an iron rod, and then stirred among the metal, or of cases containing the substances being placed among the metal, and the result has been an uncertain and irregular dissemination of the effect of the substances, and consequent uncertainty and irregularity in the quality and cost of the resulting product.

Now, according to the present invention, I have devised the means whereby the metal to be operated upon in the state of fusion, in refining, puddling, and other furnaces, is effected with more certainty and uniformity, inasmuch as these vessels or boxes need only remain in the metal to be operated upon until the purification thereof is complete, and can then be removed.

The gases evolved from the substances contained in the boxes escape from the lower side of the same, and pass up from the bottom of the receptacle containing the molten metal, so that the metal is acted upon throughout, and thereby refine, purify, and decarbonize the same.

Having described the nature of my said invention, I will now describe the manner of performing the same, reference being had to the accompanying drawings, which make part of the specification.

Figure 1 is a plan of the box.
Figure 2 is a section of the same.

The boxes or vessels are by preference made of cast-iron, and of any form that may be suitable.

The box or vessel is filled with the required substances, such as nitrates combined with manganese or without manganese, or nitrates with or without other substances.

The nitrates should be reduced first to a fusible state, and the other substances mixed therein that are to be used with them, and then poured into the boxes or vessels and allowed to solidify, or solid substances may be used to fill the boxes.

When the contents of the boxes have become solidified, they are ready for use, and are placed, with the part where the substances are not covered with the substance of the box, next to the bottom of the receptacle containing the molten metal.

A bar of iron, A, is inserted in the orifice B, in the top of the box, fastened by the wedge C, for the convenience of the workman, who then moves the box around and amongst the metal in a manner very similar to the operation of puddling, and by keeping the box against the bottom of the receptacle containing the metal, the gases that are evolved by the heat pass out from under the bottom and sides of the box into and amongst the metal, and thus pass up from the bottom of the receptacle, through and amongst the metal, thereby insuring greater regularity and uniformity of the product.

The box containing the materials can be melted amongst the decarbonized metal, and thus add carbon, which may remain and form a mild grade of steel, or the metal may be puddled or stirred until the carbon thereby added is eliminated, and thus produce malleable iron.

Having thus described the nature of my said invention, and the manner of performing the same, I would have it understood that what I claim, and desire to secure by Letters Patent, is—

The process, substantially as herein described, of applying, for decarbonizing, crude molten iron, by means of boxes or like vessels, closed at top and opened at the bottom, to contain the decarbonizing substances, the said boxes, or equivalent, being introduced in the molten metal substantially as and for the purpose specified.

JAMES HENDERSON.

Witnesses:
WM. H. BISHOP,
ANDREW DE LACY.